(12) United States Patent
Hatori et al.

(10) Patent No.: US 9,379,554 B2
(45) Date of Patent: Jun. 28, 2016

(54) CURRENT OUTPUT CIRCUIT AND TWO-WIRE TRANSMITTER

(71) Applicant: YOKOGAWA ELECTRIC CORPORATION, Musashino-shi, Tokyo (JP)

(72) Inventors: Daisuke Hatori, Musashino (JP); Youichi Iwano, Musashino (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 415 days.

(21) Appl. No.: 14/076,316

(22) Filed: Nov. 11, 2013

(65) Prior Publication Data

US 2014/0132072 A1 May 15, 2014

(30) Foreign Application Priority Data

Nov. 12, 2012 (JP) .................................. 2012-248042
Jul. 24, 2013 (JP) .................................. 2013-153505

(51) Int. Cl.
*H02J 4/00* (2006.01)
*G05F 1/56* (2006.01)

(52) U.S. Cl.
CPC . *H02J 4/00* (2013.01); *G05F 1/561* (2013.01); Y10T 307/549 (2015.04)

(58) Field of Classification Search
CPC .......... H02J 4/00; G05F 1/561; Y10T 307/549
USPC .......................................................... 307/43
See application file for complete search history.

(56) References Cited

U.S. PATENT DOCUMENTS

| 2010/0052635 | A1* | 3/2010 | Wang ....................... G05F 1/575 323/280 |
| 2012/0126858 | A1 | 5/2012 | Senda et al. |
| 2014/0015502 | A1* | 1/2014 | Chen ......................... G05F 1/56 323/281 |

FOREIGN PATENT DOCUMENTS

| EP | 0 744 724 A1 | 11/1996 |
| EP | 1 296 433 A2 | 3/2003 |
| FR | 2 159 101 A5 | 6/1973 |
| JP | 9-81883 A | 3/1997 |

OTHER PUBLICATIONS

Extended European Search Report, dated Mar. 27, 2014, issued by the European Patent Office in counterpart European Patent Application No. 13192396.3.

* cited by examiner

*Primary Examiner* — Hal Kaplan
(74) *Attorney, Agent, or Firm* — Sughrue Mion, PLLC

(57) ABSTRACT

A current output circuit for a two-wire transmitter includes a first current source circuit configured to output a first current controlled by a control voltage generated based on a physical quantity, a second current source circuit configured to output a second current controlled by the first current, a first shunt voltage source circuit configured to generate an internal power source of the two-wire transmitter from the second current, a third current source circuit configured to generate a third current controlled by a reference voltage, and a second shunt voltage source circuit configured to generate a power source of the second current source circuit by the third current. The current output circuit is configured to output a predetermined current controlled by the control voltage based on the first current, the second current and the third current to an external circuit through two transmission lines.

10 Claims, 6 Drawing Sheets

CURRENT OUTPUT CIRCUIT AND TWO-WIRE TRANSMITTER

CROSS-REFERENCE TO RELATED APPLICATION(S)

The present application claims the benefit of priorities of Japanese Patent Application No. 2012-248042, filed on Nov. 12, 2012 and Japanese Patent Application No. 2013-153505, filed on Jul. 24, 2013. The disclosures of the applications are incorporated herein by reference.

BACKGROUND

1. Technical Field

The present disclosure relates to a current output circuit which is connected to an external circuit through two transmission lines and outputs a predetermined current signal to the external circuit while using the external circuit as a power source, and a two-wire transmitter having the current output circuit.

2. Related Art

A two-wire transmitter is, for example, a field device which is connected to an external circuit such as a DCS (distributed control system) through two transmission lines and converts a physical quantity acquired from a sensor etc. into a current signal and outputs the current signal to the external circuit while using the external circuit as a power source. Since the two-wire transmitter does not require dedicated power source wiring and can be installed at low cost, the two-wire transmitter is widely used as the field device such as a temperature transmitter or a differential pressure and pressure transmitter in a plant. This field device converts a physical quantity into a direct current of 4 [mA] to 20 [mA] of a global standard as a signal of the field device, and sends the current to the external circuit.

For example, Patent Reference 1 discloses a two-wire transmitter capable of ensuring a stable circuit power source and freely setting an internal voltage by a shunt regulator (shunt voltage source circuit) rather than a zener diode.

FIG. 6 shows a configuration example of a related-art current output circuit 50 used in the two-wire transmitter described above. According to FIG. 6, the current output circuit 50 is configured to include a voltage source circuit 51, an operational amplifier 52 (op amp), a voltage-to-current conversion element 53 (NPN transistor), a current mirror circuit 54, a shunt voltage source circuit 55, a current detecting resistor R11, a feedback resistor R12, a band limiting resistor R13, and a band limiting capacitor C11. By the configuration described above, the current output circuit 50 outputs a current I1 by the shunt voltage source circuit 55 and also generates an internal power source #1 (a driving power source of a signal processing circuit or a sensor (not shown)) of the two-wire transmitter and outputs a current of Uout=(1+R12/R11)*I1 between a positive power source terminal VP and a negative power source terminal VN.

PRIOR ART REFERENCE

Patent Reference

[Patent Reference 1] JP-A-9-81883

Incidentally, according to the current output circuit 50 shown in FIG. 6, the current mirror circuit 54 is inserted into a negative feedback loop (arrow of a dotted line of FIG. 6) ranging from an output terminal of the operational amplifier 52 to a non-inverting input terminal (+) of the operational amplifier 52. In order to solve a disadvantage by insertion of this current mirror circuit 54, the band limiting capacitor C11 is connected between the output terminal of the operational amplifier 52 and an inverting input terminal (−) of the operational amplifier 52 and stability of a system ranging from an output to an input of the operational amplifier 52 is ensured by this band limiting capacitor C11.

The reason why the band limiting capacitor C11 described above is connected and stability of the system ranging from the output to the input of the operational amplifier 52 is ensured is because a pole had by the current mirror circuit 54 is in the vicinity of a band of the operational amplifier 52 and a phase rotates in the vicinity of a frequency at which a loop gain becomes one time and a phase margin (margin) cannot be ensured. Thus, in the current output circuit 50 of the related-art two-wire transmitter, a circuit element such as the current mirror circuit 54 having a low pole is inserted into the negative feedback loop of the operational amplifier 52 shown by the arrow of the dotted line in FIG. 6 and thereby a band becomes narrower and an AC input impedance becomes low and noise resistance becomes worse.

SUMMARY

Exemplary embodiments of the invention provide a current output circuit for broadening a band and improving noise resistance, and a two-wire transmitter having the current output circuit.

A current output circuit, according to an exemplary embodiment of the invention, for a two-wire transmitter configured to receive supply of a power source from an external circuit through two transmission lines and to output a predetermined current based on a physical quantity to the external circuit through the transmission lines, the current output circuit comprising:

a first current source circuit configured to output a first current controlled by a control voltage generated based on the physical quantity;

a second current source circuit configured to output a second current controlled by the first current;

a first shunt voltage source circuit configured to generate an internal power source of the two-wire transmitter from the second current;

a third current source circuit configured to generate a third current controlled by a reference voltage; and a second shunt voltage source circuit configured to generate a power source of the second current source circuit by the third current, wherein the current output circuit is configured to output the predetermined current controlled by the control voltage based on the first current, the second current and the third current.

The first current source circuit may include an operational amplifier including a non-inverting input terminal and an inverting input terminal, wherein the control voltage is applied between the non-inverting input terminal and a negative power source terminal to which one of the two transmission lines is connected, a voltage-to-current conversion element with first polarity, including a gate end connected to an output terminal of the operational amplifier, a source end connected to the inverting input terminal of the operational amplifier and a drain end connected to the second current source circuit, and a current detecting resistor including one end connected to the source end of the voltage-to-current conversion element and the other end connected to the negative power source terminal, wherein a point of connection to the source end of the voltage-to-current conversion element is connected to the inverting input terminal of the operational amplifier, and the operational amplifier is configured to control a voltage between a gate and a source of the voltage-to-current conversion element so that a voltage applied to the current detecting resistor becomes equal to the control voltage and the first current is outputted to the drain end of the voltage-to-current conversion element.

When a first control voltage of a DC component is inputted to the non-inverting input terminal of the operational amplifier and a second control voltage of an AC component is inputted to the inverting input terminal of the operational amplifier through a capacitive element, the voltage-to-current conversion element may be configured to output the first current in which the DC component and the AC component are mixed.

A plurality of the first current source circuits may be connected between a positive power source terminal and a negative power source terminal to which the two transmission lines are respectively connected, and control voltages applied between the negative power source terminal and non-inverting input terminals of operational amplifiers of the first current source circuits are respectively controlled to output the first currents.

The second current source circuit may include an operational amplifier including a non-inverting input terminal connected to an output of the first current source circuit and an inverting input terminal connected to a positive power source terminal to which one of the two transmission lines is connected through a current detecting resistor, a current-to-voltage conversion resistor connected between the positive power source terminal and the non-inverting input terminal of the operational amplifier and configured to convert the first current into a voltage, a voltage-to-current conversion element with second polarity, including a gate end connected to an output terminal of the operational amplifier, a source end connected to the inverting input terminal of the operational amplifier and a drain end connected to the first shunt voltage source circuit, the voltage-to-current conversion element configured to output the second current controlled by the first current to the drain end, and the current detecting resistor including one end connected to the source end of the voltage-to-current conversion element and the other end connected to the positive power source terminal, wherein a point of connection to the source end of the voltage-to-current conversion element is connected to the inverting input terminal of the operational amplifier, and the operational amplifier is configured to control a voltage between a gate and a source of the voltage-to-current conversion element so that a voltage applied to the current detecting resistor becomes equal to the voltage converted by the current-to-voltage conversion resistor, and the second current is outputted to the drain end of the voltage-to-current conversion element.

The second current source circuit may include a current limiting resistor including one end connected to the current-to-voltage conversion resistor and the other end connected to a drain end of a voltage-to-current conversion element of the first current source circuit, the current limiting resistor configured to limit a current flowing through a parasitic capacitor of the voltage-to-current conversion element of the first current source circuit to suppress fluctuations in the first current, and a capacitive element connected in parallel with the current-to-voltage conversion resistor and configured to suppress fluctuations in a voltage applied to both ends of the current-to-voltage conversion resistor by the fluctuations in the first current.

The voltage-to-current conversion element may include a MOS transistor with the second polarity, and a bipolar transistor Darlington-connected to the MOS transistor, and the second current may be outputted through a collector end of the bipolar transistor and feedback may be given to the inverting input terminal of the operational amplifier through a source resistor configured to decide an operating point of the MOS transistor in a base end of the bipolar transistor.

The second current source circuit nay be configured to generate a second internal power source with a voltage lower than that of the internal power source by the second current and to apply the second internal power source to a drain end of the MOS transistor and to enable low-voltage operation in the case where a voltage between the positive power source terminal and a negative power source terminal to which the other of the two transmission lines is connected is lower than a predetermined value.

The third current source circuit may include an operational amplifier including a non-inverting input terminal and an inverting input terminal, wherein a reference voltage is applied between the non-inverting input terminal and a negative power source terminal to which one of the two transmission lines is connected, a voltage-to-current conversion element with second polarity, including a gate end connected to an output terminal of the operational amplifier, a source end connected to the inverting input terminal of the operational amplifier and a drain end connected to the second shunt voltage source circuit, wherein the third current is outputted through the drain end, and a current detecting resistor connected between the negative power source terminal and the source end of the voltage-to-current conversion element, wherein a point of connection to the source end of the voltage-to-current conversion element is connected to the inverting input terminal of the operational amplifier, and the operational amplifier is configured to control a voltage between a gate and a source of the voltage-to-current conversion element so that a voltage applied to the current detecting resistor becomes equal to the reference voltage, and the third current is outputted to the drain end of the voltage-to-current conversion element.

A two-wire transmitter according to an exemplary embodiment comprises:

a sensor configured to measure a physical quantity and to convert the measured physical quantity into an electrical signal;

a signal processing circuit configured to perform signal processing with respect to the electrical signal to generate a control voltage; and a current output circuit as mentioned above, configured to receive supply of a power source from an external circuit through a positive power source terminal and a negative power source terminal respectively connected to two transmission lines, and to output a predetermined current based on the control voltage from the signal processing circuit to the external circuit through the transmission lines.

According to the exemplary embodiments of the invention, it is possible to provide a current output circuit for broadening a band and improving noise resistance, and a two-wire transmitter having the same circuit.

DETAILED DESCRIPTION

Exemplary embodiments of the invention will hereinafter be described in detail with reference to the accompanying drawings.

Configuration of Embodiment

Figure 1:
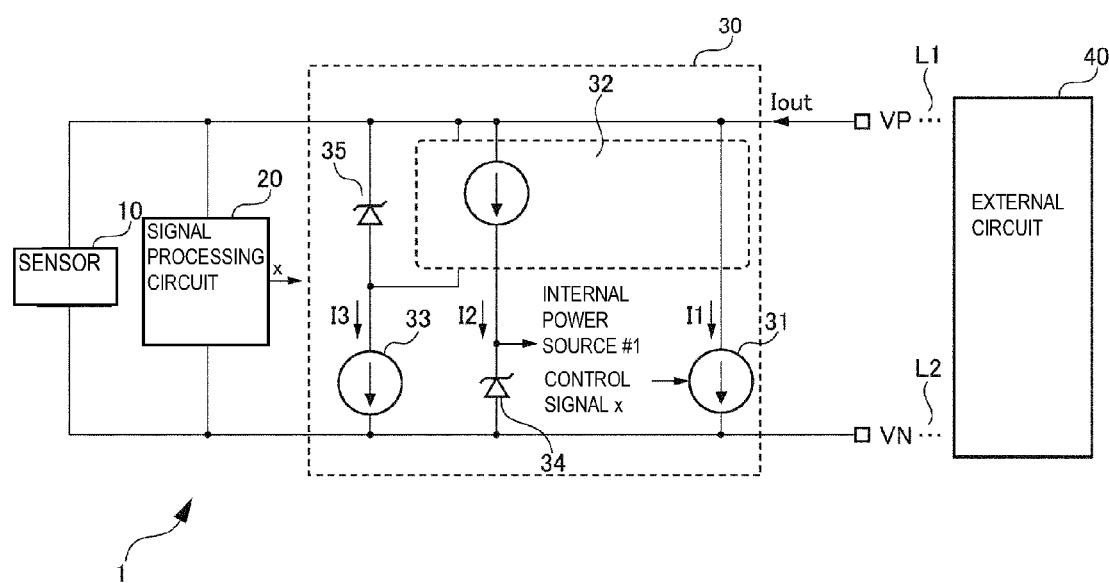
FIG. 1 is a diagram showing a basic configuration of a two-wire transmitter according to the present embodiment.

FIG. 1 is a diagram showing a basic configuration of a two-wire transmitter according to the present embodiment. According to FIG. 1, a two-wire transmitter 1 according to the present embodiment includes a sensor 10, a signal processing circuit 20 and a current output circuit 30. The two-wire transmitter 1 is connected to an external circuit 40 such as a DCS through a positive power source terminal VP and a negative power source terminal VN respectively connected to two transmission lines L1, L2.

The two-wire transmitter 1 is, for example, a field device, and receives supply of a power source from the external circuit 40 through the two transmission lines L1, L2. The sensor 10 measures a physical quantity and converts it into an electrical signal. The signal processing circuit 20 performs signal processing with respect to the electrical signal. The current output circuit 30 outputs a predetermined current of, for example, 4 [mA] to 20 [mA] based on the output from the signal processing circuit 20 to the external circuit 40 through the transmission lines L1, L2.

The current output circuit 30 includes current source circuits 31 (a first current source circuit), 32 (a second current source circuit), 33 (a third current source circuit), shunt voltage source circuits 34 (a first shunt voltage source circuit) and 35 (a second shunt voltage source circuit). The current source circuit 31 generates a current I1 (first current) controlled by a control voltage (control signal x) outputted from the signal processing circuit 20, and outputs the current I1 to the current source circuit 32. The current source circuit 32 (second current source circuit) generates a current I2 (second current) controlled by the current I1, and outputs the current I2 to the shunt voltage source circuit 34.

The shunt voltage source circuit 34 (first shunt voltage source circuit) generates an internal power source #1 of the two-wire transmitter 1 (the sensor 10 and the signal processing circuit 20) from the current I2 outputted from the current source circuit 32. The current source circuit 33 generates a current I3 (third current) controlled by a reference voltage Vref. The shunt voltage source circuit 35 generates a power source of the current source circuit 32 by the current I3 outputted from the current source circuit 33.

The current output circuit 30 outputs a predetermined current Iout of 4 to 20 [mA] controlled by the control voltage (control signal x) to the external circuit 40 through the transmission lines L1, L2 by means of the current I1 generated by the current source circuit 31, the current I2 generated by the current source circuit 32 and the current I3 generated by the current source circuit 33.

Figure 2:
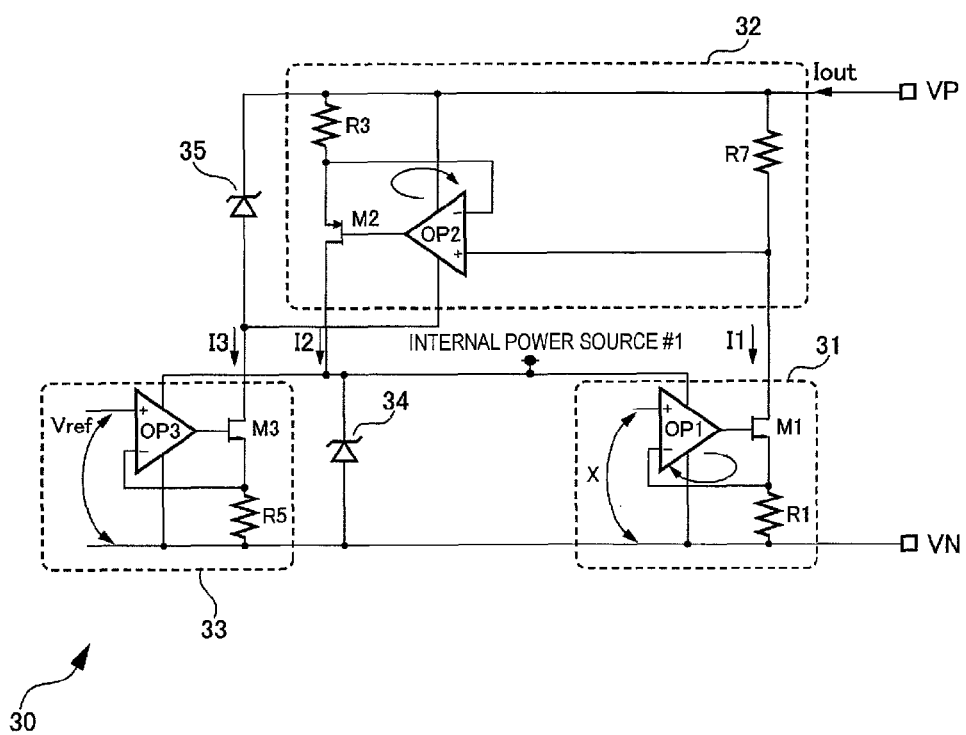
FIG. 2 is a diagram showing a configuration of a current source circuit according to the present embodiment.

FIG. 2 shows a detailed circuit configuration of each of the current source circuits 31, 32, 33 constructing the current output circuit 30 according to the present embodiment.

In FIG. 2, the current source circuit 31 is configured to include an operational amplifier OP1, a voltage-to-current conversion element M1 (voltage-to-current conversion element having first polarity) made of an N-type MOS-FET, and a current detecting resistor R1. In the operational amplifier OP1, the control voltage (control signal x) generated by the signal processing circuit 20 is applied between a non-inverting input terminal (+) and the negative power source terminal VN connected to the transmission line L2. In the voltage-to-current conversion element M1, the gate end is connected to an output terminal of the operational amplifier OP1, the source end is connected to an inverting input terminal (−) of the operational amplifier OP1 and the drain end is connected to the current source circuit 32 (one end of a current-to-voltage conversion resistor R7 and a non-inverting input terminal (+) of an operational amplifier OP2 described below), respectively. The current I1 generated herein (the current source circuit 31) is outputted to the current source circuit 32 through the drain end. In the current detecting resistor R1, one end is connected to the source end of the voltage-to-current conversion element M1 and the other end is connected to the negative power source terminal VN and a point of connection to the source end of the voltage-to-current conversion element M1 is connected to the inverting input terminal (−) of the operational amplifier OP1.

The current source circuit 32 is configured to include an operational amplifier OP2, a voltage-to-current conversion element M2 (voltage-to-current conversion element having second polarity) made of a P-type MOS-FET, a current detecting resistor R3, and the current-to-voltage conversion resistor R7.

In the operational amplifier OP2, an output of the current source circuit 31 (the drain end of the voltage-to-current conversion element M1) is connected to a non-inverting input terminal (+) and the positive power source terminal VP connected to the transmission line L1 through the current detecting resistor R3 is connected to an inverting input terminal (−), respectively. In the voltage-to-current conversion element M2, the gate end is connected to an output terminal of the operational amplifier OP2, the source end is connected to the inverting input terminal (−) of the operational amplifier OP2 and the drain end is connected to the shunt voltage source circuit 34, respectively. The current I2 controlled by the current I1 generated by the current source circuit 31 is generated and outputted to the shunt voltage source circuit 34 through the drain end. In the current detecting resistor R3, one end is connected to the source end of the voltage-to-current conversion element M2 and the other end is connected to the positive power source terminal VP and a point of connection to the source end of the voltage-to-current conversion element M2 is connected to the inverting input terminal (−) of the operational amplifier OP2. Also, the current-to-voltage conversion resistor R7 is connected between the positive power source terminal VP and the non-inverting input terminal (+) of the operational amplifier OP2.

The current source circuit 33 is configured to include an operational amplifier OP3, a voltage-to-current conversion element M3 made of a P-type MOS-FET, and a current detecting resistor R5.

In the operational amplifier OP3, a reference voltage is applied between a non-inverting input terminal (+) and the negative power source terminal VN. In the voltage-to-current conversion element M3, the gate end is connected to an output terminal of the operational amplifier OP3, the source end is connected to an inverting input terminal (−) of the operational amplifier OP3 and the drain end is connected to the shunt voltage source circuit 35, respectively. The current I3 is generated and outputted to the shunt voltage source circuit 35 through the drain end. The current detecting resistor R5 is connected between the negative power source terminal VN and the source end of the voltage-to-current conversion element M3, and a point of connection to the source end of the voltage-to-current conversion element M3 is connected to the inverting input terminal (−) of the operational amplifier OP3.

Operation of Embodiment

Operation of the current output circuit 30 according to the present embodiment will hereinafter be described in detail with reference to FIGS. 1 and 2.

First, the sensor 10 converts a physical quantity such as pressure or temperature into an electrical signal and outputs the electrical signal to the signal processing circuit 20. The signal processing circuit 20 performs predetermined processing such as strain correction or noise elimination with respect to the electrical signal outputted from the sensor 10 and generates the control signal x (control voltage). The control voltage is applied between the negative power source terminal VN and the non-inverting input terminal (+) of the operational amplifier OP1 constructing the current source circuit 31.

The current source circuit 31 generates the current I1 controlled by this control voltage (control signal x). That is, the operational amplifier OP1 performs control so that a voltage applied to both ends of the current detecting resistor R1 becomes the same voltage value as the control voltage x by controlling a voltage between the gate and the source of the voltage-to-current conversion element M1. As a result, the control voltage (control signal x) is converted into the current I1, and its current I1 is outputted to the current source circuit 32 (one end of the current-to-voltage conversion resistor R7 and the non-inverting input terminal of the operational amplifier OP2) through the drain end of the voltage-to-current conversion element M1.

Next, the current source circuit 32 generates the current I2 controlled by the current I1 generated by the current source circuit 31. That is, the current I1 flows through the current-to-voltage conversion resistor R7 and thereby, a voltage drops and the current I1 is again converted into a voltage and this voltage (hereinafter referred as VP reference voltage) is applied between the positive power source terminal VP and the non-inverting input terminal (+) of the operational amplifier OP2. Then, by the VP reference voltage, the operational amplifier OP2 performs control so that a voltage applied to both ends of the current detecting resistor R3 becomes the same voltage value as the VP reference voltage by controlling a voltage between the gate and the source of the voltage-to-current conversion element M2. As a result, the current I2 generated is outputted to the shunt voltage source circuit 34 through the drain end. The shunt voltage source circuit 34 generates the internal power source #1 for driving the sensor 10 and the signal processing circuit 20 using this current I2.

A main carrier of the voltage-to-current conversion element (P-type MOS-FET) constructing the current source circuit 32 is a hole (positive hole), and when a voltage inputted to the gate end is lower than that of the source end (a voltage between the gate and the source), a current flows from the source to the drain and as an input voltage is nearer to the − (negative) side, its current becomes larger and as the input voltage is nearer to the + (positive) side, the current becomes smaller and becomes 0 at a predetermined value.

The current source circuit 33 and the shunt voltage source circuit 35 generate a power source of the current source circuit 32. That is, in the current source circuit 33, the reference voltage Vref is applied between the negative power source terminal VN and the non-inverting input terminal (+) of the operational amplifier OP3, and the operational amplifier OP3 performs control so that a voltage applied to both ends of the current detecting resistor R5 becomes the same value as the reference voltage Vref by controlling a voltage between the gate and the source of the voltage-to-current conversion element M3. As a result, the reference voltage Vref is converted into the current I3 and is outputted to the shunt voltage source circuit 35 through the drain end of the voltage-to-current conversion element M3. The shunt voltage source circuit 35 generates the power source of the current source circuit 32 by the current I3.

Finally, the current output circuit 30 generates a current Iout of 4 to 20 [mA] controlled by the control voltage (control signal x) by means of the current I1 generated by the current source circuit 31, the current I2 generated by the current source circuit 32 and the current I3 generated by the current source circuit 33, and outputs the current Iout to the external circuit 40 such as the DCS through the two transmission lines L1, L2 and also, generates the internal power source #1 for driving the sensor 10 and the signal processing circuit 20. When a transfer function of the current source circuit 31 is set at f(x) and a transfer function of the current source circuit 32 is set at g(I2) herein, I1=f(x), I2=g(f(x)) and Iout=f(x)+g(f(x))+I3 are obtained.

Effect of Embodiment

According to the current output circuit 30 according to the present embodiment as described above, an element such as a current mirror circuit having a low pole is not included inside negative feedback loops of the operational amplifiers (OP1, OP2, respectively) constructing the current source circuits 31, 32 shown by arrows of solid lines in the drawings (an element with slow response is eliminated), so that it becomes unnecessary to limit a band and therefore, the two-wire transmitter 1 capable of broadening the band can be provided. Concretely, the two-wire transmitter 1 superimposes an AC digital signal on a DC analog signal of 4 to 20 [mA] and transmits the signal to the external circuit 40, and an output can be produced without changing a constant inside one two-wire transmitter 1 (field device) from a communication waveform with a low carrier frequency, for example, an HART (Highway Addressable Remote Transducer) to a communication waveform with a high carrier frequency, for example, a Foundation Field BUS.

Also, by broadening the band, secondary effects of improving an AC input impedance and improving noise resistance by improving the input impedance can be obtained. In addition, an internal power source can be generated while outputting a current.

First Modified Example

Figure 3:
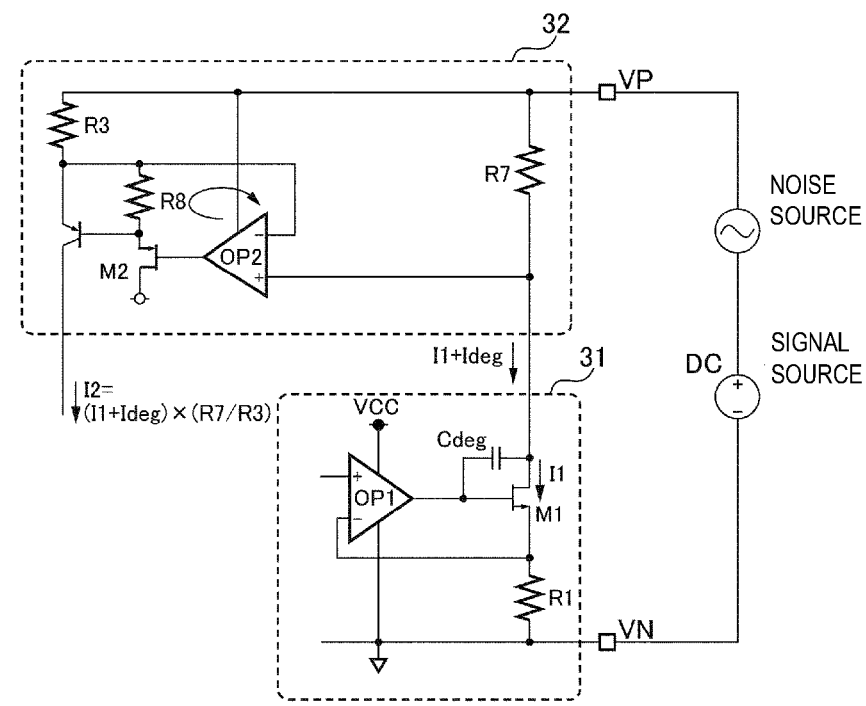
FIG. 3 is a diagram showing a configuration of the current source circuit according to the present embodiment in the case of applying the normal mode noise.

Incidentally, noise generated in the current output circuit 30 according to the present embodiment described above can be classified into two kinds by a method (mode) of conduction. One kind is normal mode noise generated between signal lines or power source lines, and the other kind is common mode noise generated between GND and a signal line or a power source line. FIG. 3 is a diagram selectively showing a configuration of the periphery of the first current source circuit 31 and the second current source circuit 32 in the current output circuit 30 according to the present embodiment in the case of applying the normal mode noise.

When the normal mode noise (noise source) is applied between the positive power source terminal VP and the negative power source terminal VN in FIG. 3, a current Ideg flows through a parasitic capacitor Cdeg of a voltage-to-current conversion element M1 of the first current source circuit 31. Since this current Ideg cannot be controlled by an operational amplifier OP1, a current flowing through the parasitic capacitor Cdeg appears as fluctuations (I1+Ideg) in a first current I1. The fluctuations in this first current I1 are multiplied by a constant, and are reflected in fluctuations (I2=(I1+Ideg)×(R7/R3)) in a second current I2 outputted by the second current source circuit 32, and the fluctuations in this second current I2 become larger than the fluctuations (I1+Ideg) in the first current I1.

Figure 4:
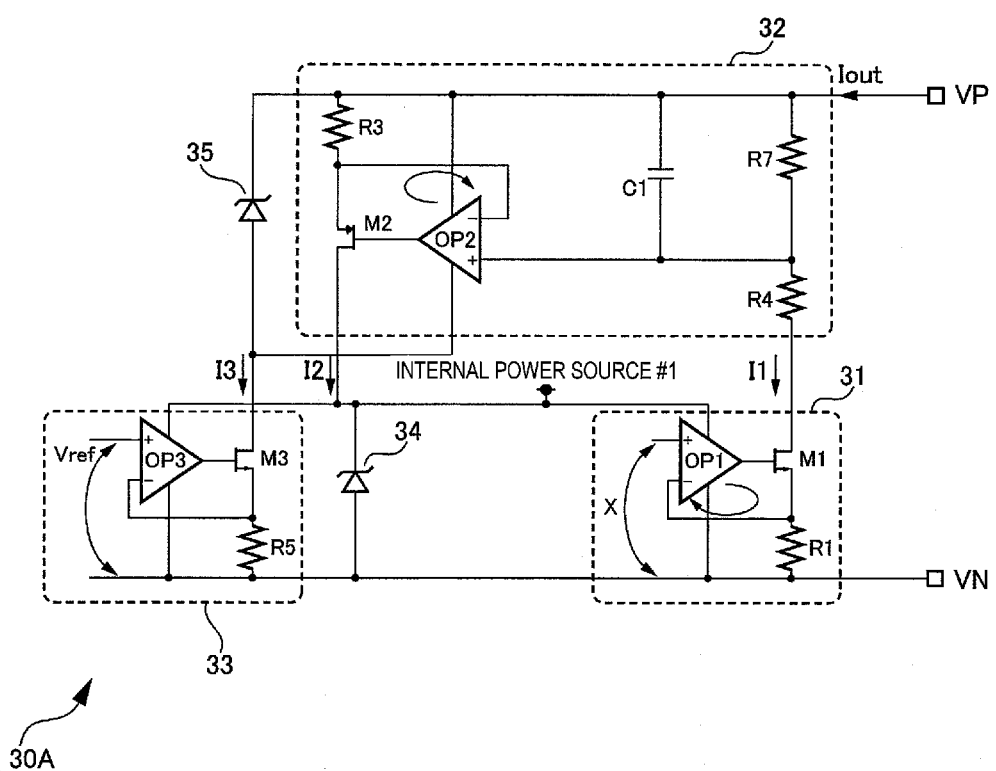
FIG. 4 is a diagram showing a configuration of a current output circuit of a first modified example according to the present embodiment.

Because of this, a current output circuit 30A of a first modified example described below is constructed so as to suppress fluctuations in a first current I1 by a capacitive element (a capacitor C1 shown in FIG. 4) and a current limiting resistor (a resistor R4 shown in FIG. 4) in order to suppress fluctuations in a second current I2. FIG. 4 shows a configuration of the current output circuit 30A for the suppression. According to FIG. 4, the current output circuit 30A of the first modified example has a configuration similar to that of the current output circuit 30 according to the present embodiment shown in FIG. 2 except that the capacitor C1 and the current limiting resistor R4 are added.

In the current limiting resistor R4, one end is connected to a current-to-voltage conversion resistor R7 and the other end is connected to the drain end of a voltage-to-current conversion element M1, respectively, and a current flowing through a parasitic capacitor Cdeg of the voltage-to-current conversion element M1 is limited to suppress fluctuations in the first current I1. Also, the capacitor C1 is connected in parallel with the current-to-voltage conversion resistor R7, and suppresses fluctuations in a voltage applied to both ends of the current-to-voltage conversion resistor R7 by the fluctuations in the first current I1. This suppression of fluctuations in the voltage of both ends of the current-to-voltage conversion resistor R7 leads to suppression of fluctuations in the second current I2.

According to the current output circuit 30A of the first modified example described above, the capacitor C1 is connected in parallel with the current-to-voltage conversion resistor R7 and fluctuations in the voltage of both ends of the current-to-voltage conversion resistor R7 by fluctuations in the first current I1 are suppressed and the current limiting resistor R4 is inserted between the current-to-voltage conversion resistor R7 and the drain end of the voltage-to-current conversion element M1 and the current flowing through the parasitic capacitor Cdeg of the voltage-to-current conversion element M1 is limited to suppress fluctuations in the first current I1. Therefore, fluctuations in the second current I2 can be suppressed. When fluctuations in this second current I2 are suppressed, a voltage or a current flowing through a third current source circuit 33 to which the second current I2 is outputted becomes small, so that a situation in which the current output circuit 30A of the first modified example malfunctions can be avoided. Consequently, a two-wire transmitter 1 for improving noise resistance and improving soundness of the current output circuit 30A can be provided.

Second Modified Example

Figure 5:
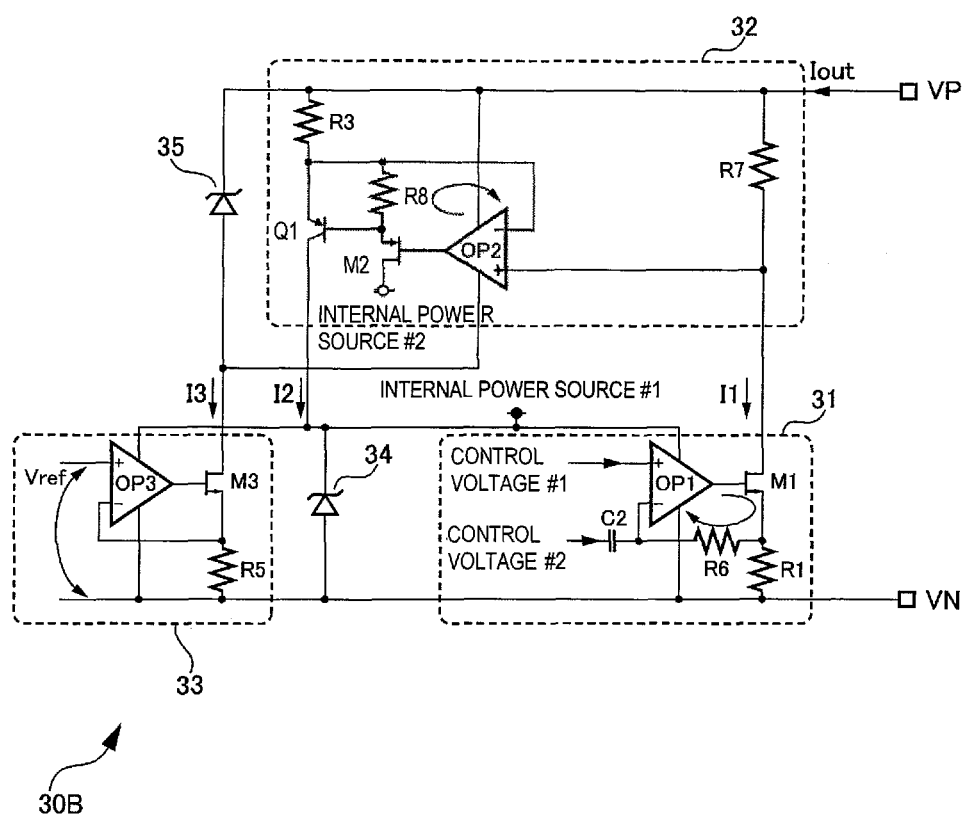
FIG. 5 is a diagram showing a configuration of a current output circuit of a second modified example according to the present embodiment.
Figure 6:
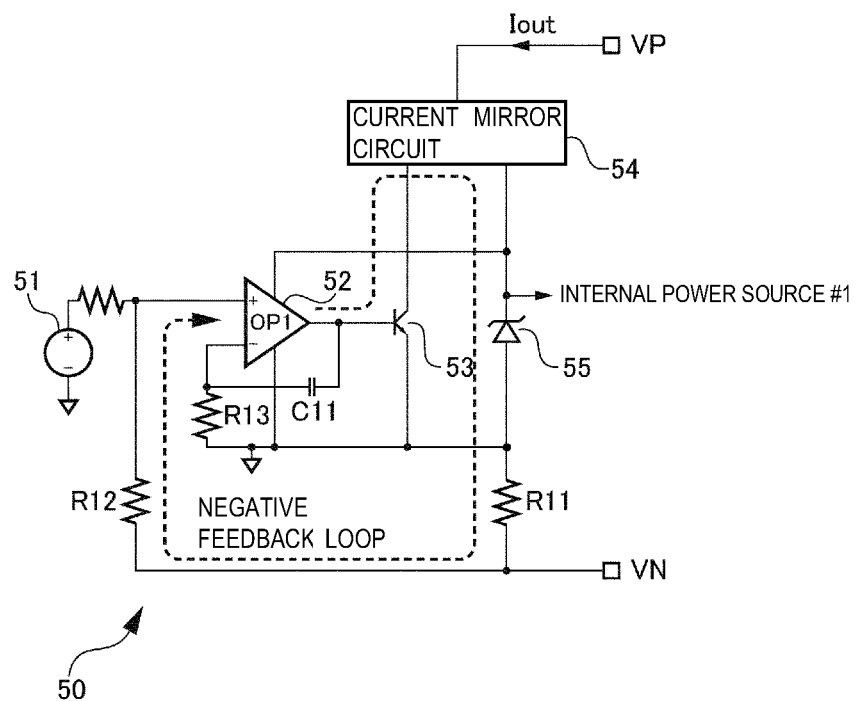
FIG. 6 is a diagram showing a configuration of the related-art current source circuit.

Next, a current output circuit 30B of a second modified example will be described with reference to FIG. 5. As shown in FIG. 5, the current output circuit 30B of the second modified example can obtain an output current Iout in which a DC component and an AC component are mixed by inputting a control voltage #1 (first control voltage) of a DC component to a non-inverting input terminal (+) of an operational amplifier OP1 constructing a current source circuit 31 and inputting a control voltage #2 (second control voltage) of an AC component to an inverting input terminal (−) of the operational amplifier OP1 through a capacitor C2 (capacitive element), respectively. In this case, the need for a mixing circuit of a subsequent stage is eliminated. Also, though illustration is omitted, between a positive power source terminal VP and a negative power source terminal VN to which two transmission lines L1, L2 are respectively connected, the plural current source circuits 31 are connected in parallel and the control voltages (control signals x) respectively applied are controlled to generate a current I1 and thereby, the current output circuit 30B with high extensibility and flexibility can be provided.

Also, a current source circuit 32 may have a connection configuration in which a current-to-voltage conversion element M2 includes a P-type MOS-FET (M2) and a bipolar transistor (PNP transistor Q1) Darlington-connected to the MOS-FET (M2) and a current I2 is outputted through the collector end of this PNP transistor Q1 and feedback is given to an inverting input terminal (−) of an operational amplifier OP2 through a source resistor R8 for deciding an operating point of the MOS-FET (M2) in the base end of the transistor. According to this configuration, low gm (mutual conductance) of the MOS-FET (M2) can be compensated while maintaining current accuracy.

Also, in the current source circuit 32 described above, when an internal power source #2 (second internal power source) with a voltage lower than that of an internal power source #1 (first internal power source) is generated by the current I2 and the second internal power source is applied to the drain end of the MOS-FET (M2), low-voltage operation in the case where a voltage between the positive power source terminal VP and the negative power source terminal VN is lower than a predetermined value is enabled.

The preferred embodiment of the invention has been described above in detail, but it goes without saying that the technical scope of the invention is not limited to the scope described in the embodiment described above. It is apparent to those skilled in the art that various modifications or improvements can be made in the embodiment described above. Also, it is apparent from the description of the claims that modes in which such modifications or improvements are added can be included in the technical scope of the invention.

What is claimed is:

1. A current output circuit for a two-wire transmitter configured to receive supply of a power source from an external circuit through two transmission lines and to output a predetermined current based on a physical quantity to the external circuit through the transmission lines, the current output circuit comprising:
   a first current source circuit configured to output a first current controlled by a control voltage generated based on the physical quantity;
   a second current source circuit configured to output a second current controlled by the first current;
   a first shunt voltage source circuit configured to generate an internal power source of the two-wire transmitter from the second current;
   a third current source circuit configured to generate a third current controlled by a reference voltage; and
   a second shunt voltage source circuit configured to generate a power source of the second current source circuit by the third current, wherein the current output circuit is configured to output the predetermined current controlled by the control voltage based on the first current, the second current and the third current.

2. The current output circuit as claimed in claim 1, wherein the first current source circuit includes:
    an operational amplifier including a non-inverting input terminal and an inverting input terminal, wherein the control voltage is applied between the non-inverting input terminal and a negative power source terminal to which one of the two transmission lines is connected,
    a voltage-to-current conversion element with first polarity, including a gate end connected to an output terminal of the operational amplifier, a source end connected to the inverting input terminal of the operational amplifier and a drain end connected to the second current source circuit, and
    a current detecting resistor including one end connected to the source end of the voltage-to-current conversion element and the other end connected to the negative power source terminal, wherein a point of connection to the source end of the voltage-to-current conversion element is connected to the inverting input terminal of the operational amplifier, and
    the operational amplifier is configured to control a voltage between a gate and a source of the voltage-to-current conversion element so that a voltage applied to the current detecting resistor becomes equal to the control voltage and the first current is outputted to the drain end of the voltage-to-current conversion element.

3. The current output circuit as claimed in claim 2, wherein when a first control voltage of a DC component is inputted to the non-inverting input terminal of the operational amplifier and a second control voltage of an AC component is inputted to the inverting input terminal of the operational amplifier through a capacitive element, the voltage-to-current conversion element is configured to output the first current in which the DC component and the AC component are mixed.

4. The current output circuit as claimed in claim 1, wherein a plurality of the first current source circuits are connected between a positive power source terminal and a negative power source terminal to which the two transmission lines are respectively connected, and
    control voltages applied between the negative power source terminal and non-inverting input terminals of operational amplifiers of the first current source circuits are respectively controlled to output the first currents.

5. The current output circuit as claimed in claim 1, wherein the second current source circuit includes:
    an operational amplifier including a non-inverting input terminal connected to an output of the first current source circuit and an inverting input terminal connected to a positive power source terminal to which one of the two transmission lines is connected through a current detecting resistor,
    a current-to-voltage conversion resistor connected between the positive power source terminal and the non-inverting input terminal of the operational amplifier and configured to convert the first current into a voltage,
    a voltage-to-current conversion element with second polarity, including a gate end connected to an output terminal of the operational amplifier, a source end connected to the inverting input terminal of the operational amplifier and a drain end connected to the first shunt voltage source circuit, the voltage-to-current conversion element configured to output the second current controlled by the first current to the drain end, and
    the current detecting resistor including one end connected to the source end of the voltage-to-current conversion element and the other end connected to the positive power source terminal, wherein a point of connection to the source end of the voltage-to-current conversion element is connected to the inverting input terminal of the operational amplifier, and
    the operational amplifier is configured to control a voltage between a gate and a source of the voltage-to-current conversion element so that a voltage applied to the current detecting resistor becomes equal to the voltage converted by the current-to-voltage conversion resistor, and the second current is outputted to the drain end of the voltage-to-current conversion element.

6. The current output circuit as claimed in claim 5, wherein the second current source circuit includes:
    a current limiting resistor including one end connected to the current-to-voltage conversion resistor and the other end connected to a drain end of a voltage-to-current conversion element of the first current source circuit, the current limiting resistor configured to limit a current flowing through a parasitic capacitor of the voltage-to-current conversion element of the first current source circuit to suppress fluctuations in the first current, and
    a capacitive element connected in parallel with the current-to-voltage conversion resistor and configured to suppress fluctuations in a voltage applied to both ends of the current-to-voltage conversion resistor by the fluctuations in the first current.

7. The current output circuit as claimed in claim 5, wherein the voltage-to-current conversion element includes
    a MOS transistor with the second polarity, and
    a bipolar transistor Darlington-connected to the MOS transistor, and
    the second current is outputted through a collector end of the bipolar transistor and feedback is given to the inverting input terminal of the operational amplifier through a source resistor configured to decide an operating point of the MOS transistor in a base end of the bipolar transistor.

8. The current output circuit as claimed in claim 7, wherein the second current source circuit is configured to generate a second internal power source with a voltage lower than that of the internal power source by the second current and to apply the second internal power source to a drain end of the MOS transistor and to enable low-voltage operation in the case where a voltage between the positive power source terminal and a negative power source terminal to which the other of the two transmission lines is connected is lower than a predetermined value.

9. The current output circuit as claimed in claim 1, wherein the third current source circuit includes:
    an operational amplifier including a non-inverting input terminal and an inverting input terminal, wherein a reference voltage is applied between the non-inverting input terminal and a negative power source terminal to which one of the two transmission lines is connected,
    a voltage-to-current conversion element with second polarity, including a gate end connected to an output terminal of the operational amplifier, a source end connected to the inverting input terminal of the operational amplifier and a drain end connected to the second shunt voltage source circuit, wherein the third current is outputted through the drain end, and a current detecting resistor connected between the negative power source terminal and the source end of the voltage-to-current conversion element, wherein a point of connection to the source end of the voltage-to-current conversion element is connected to the inverting input terminal of the operational amplifier, and the operational amplifier is configured to control a voltage between a gate and a source of the voltage-to-current conversion element so that a voltage applied to the current detecting resistor becomes equal to the reference voltage, and the third current is outputted to the drain end of the voltage-to-current conversion element.

10. A two-wire transmitter comprising:

a sensor configured to measure a physical quantity and to convert the measured physical quantity into an electrical signal;

a signal processing circuit configured to perform signal processing with respect to the electrical signal to generate a control voltage; and a current output circuit as claimed in claim 1, configured to receive supply of a power source from an external circuit through a positive power source terminal and a negative power source terminal respectively connected to two transmission lines, and to output a predetermined current based on the control voltage from the signal processing circuit to the external circuit through the transmission lines.

* * * * *